United States Patent
Wang et al.

(10) Patent No.: US 12,316,882 B2
(45) Date of Patent: May 27, 2025

(54) VIDEO TRANSCODING METHOD AND APPARATUS, AND ELECTRONIC DEVICE AND STORAGE MEDIUM

(71) Applicant: BEIJING HUIJUN TECHNOLOGY CO., LTD., Beijing (CN)

(72) Inventors: Qiang Wang, Beijing (CN); Shujun Zhang, Beijing (CN)

(73) Assignee: BEIJING HUIJUN TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/266,677

(22) PCT Filed: Apr. 11, 2022

(86) PCT No.: PCT/CN2022/086187
§ 371 (c)(1),
(2) Date: Jun. 12, 2023

(87) PCT Pub. No.: WO2022/228104
PCT Pub. Date: Nov. 3, 2022

(65) Prior Publication Data
US 2024/0048778 A1 Feb. 8, 2024

(30) Foreign Application Priority Data
Apr. 30, 2021 (CN) .......................... 202110487567.6

(51) Int. Cl.
*H04N 19/86* (2014.01)
*H04N 19/117* (2014.01)
(Continued)

(52) U.S. Cl.
CPC .......... *H04N 19/86* (2014.11); *H04N 19/117* (2014.11); *H04N 19/147* (2014.11);
(Continued)

(58) Field of Classification Search
CPC .... H04N 19/86; H04N 19/117; H04N 19/147; H04N 19/176; H04N 19/40; H04N 19/467
See application file for complete search history.

(56) References Cited

U.S. PATENT DOCUMENTS

| | | | |
|---|---|---|---|
| 8,351,513 B2 * | 1/2013 | Wen | H04N 19/139 375/240.26 |
| 2006/0227873 A1 | 10/2006 | Toebes et al. | |
| 2024/0146949 A1 * | 5/2024 | Li | H04N 19/40 |

FOREIGN PATENT DOCUMENTS

| | | |
|---|---|---|
| CN | 108600757 A | 9/2018 |
| CN | 108769828 A | 11/2018 |

(Continued)

OTHER PUBLICATIONS

Daigoro Bando et al., "Office ACtion for JP application 2023-558930", Jul. 23, 2024, JPO, Japan.

*Primary Examiner* — Kyle M Lotfi
(74) *Attorney, Agent, or Firm* — Bridgeway IP Law Group, PLLC; Jihun Kim

(57) ABSTRACT

A video transcoding method includes: decoding a source video stream to obtain a first video frame and decoding information, and inserting watermark information into the first video frame to generate a second video frame; determining types of macroblocks in the second video frame based on the watermark information and the decoding information; for each macroblock, determining target encoding parameters required for encoding the macroblock based on the type of the macroblock and a rate distortion optimization (RDO) algorithm; and performing macroblock coding according to the target coding parameters of each macroblock, so as to generate a transcoded target video stream.

15 Claims, 7 Drawing Sheets

(51) Int. Cl.
*H04N 19/147* (2014.01)
*H04N 19/176* (2014.01)
*H04N 19/40* (2014.01)
*H04N 19/467* (2014.01)

(52) U.S. Cl.
CPC ........... *H04N 19/176* (2014.11); *H04N 19/40* (2014.11); *H04N 19/467* (2014.11)

(56) References Cited

FOREIGN PATENT DOCUMENTS

| | | |
|---|---|---|
| CN | 111225277 A | 6/2020 |
| CN | 113014926 A | 6/2021 |
| JP | 2002016924 A | 1/2002 |
| JP | 2006270436 A | 10/2006 |

* cited by examiner

VIDEO TRANSCODING METHOD AND APPARATUS, AND ELECTRONIC DEVICE AND STORAGE MEDIUM

CROSS-REFERENCE TO RELATED APPLICATIONS

This application is the US national phase application of International Application No. PCT/CN2022/086187, filed on Apr. 11, 2022, which is based on and claims priority to Chinese application No. 202110487567.6, filed on Apr. 30, 2021, the entire contents of which are incorporated herein by reference for all purposes.

TECHNICAL FIELD

The present disclosure relates to a field of image processing technologies, specifically to a video transcoding method and apparatus, an electronic device, and a storage medium.

BACKGROUND

In the related art, when watermarking and transcoding the source video stream, it is necessary to first decode the video, then watermark the video frame, and finally encode. This universal transcoding scheme has high computational complexity, long running time, significant video quality loss, and inconsistent input and output bit rates.

SUMMARY

Embodiments of a first aspect of the present disclosure provide a video transcoding method, including:
  decoding a source video stream to obtain a first video frame and decoding information, and inserting watermark information into the first video frame to generate a second video frame;
  determining types of macroblocks in the second video frame based on the watermark information and the decoding information;
  for each macroblock, determining target encoding parameters required for encoding the macroblock based on the type and a rate distortion optimization algorithm; and
  performing macroblock encoding according to the target encoding parameters for each macroblock, to generate a transcoded target video stream.

Embodiments of a second aspect of the present disclosure provide an electronic device, including:
  at least one processor;
  a memory in communication connection with the at least one processor,
  wherein the memory is stored with instructions executable by the at least one processor, which when executed by the at least one processor, enable the at least one processor to perform the method provided in embodiments of the first aspect of the present disclosure.

Embodiments of a third aspect of the present disclosure provide a computer readable storage medium stored with computer instructions, wherein the computer instructions are configured to cause a computer to perform the method provided in embodiments of the first aspect of the present disclosure.

DETAILED DESCRIPTION

The following is a detailed description of embodiments of the present disclosure, examples of which are shown in the accompanying drawings, where the same or similar numbers throughout represent the same or similar components or components with the same or similar functions. The embodiments described below with reference to the accompanying drawings are exemplary and intended to explain the present disclosure, but cannot be understood as limiting the present disclosure.

H.264 is a highly compressed digital video codec standard and a widely used digital video compression format. H.264 mainly has four profiles, namely, baseline profile, main profile, high profile, and extended profile. Each profile uses a different encoding tool. For example, the baseline profile only supports Context Adaptive Variable Length Coding (CAVLC) and intra (I)/Predictive encoded (P) frames, while the high profile supports Context-based Adaptive Binary Arithmetic Coding (CABAC) and Bidirectionally-predicted (B) frames. Video live streaming and on-demand often use baseline profile, main profile, and high profile.

Figure 1:
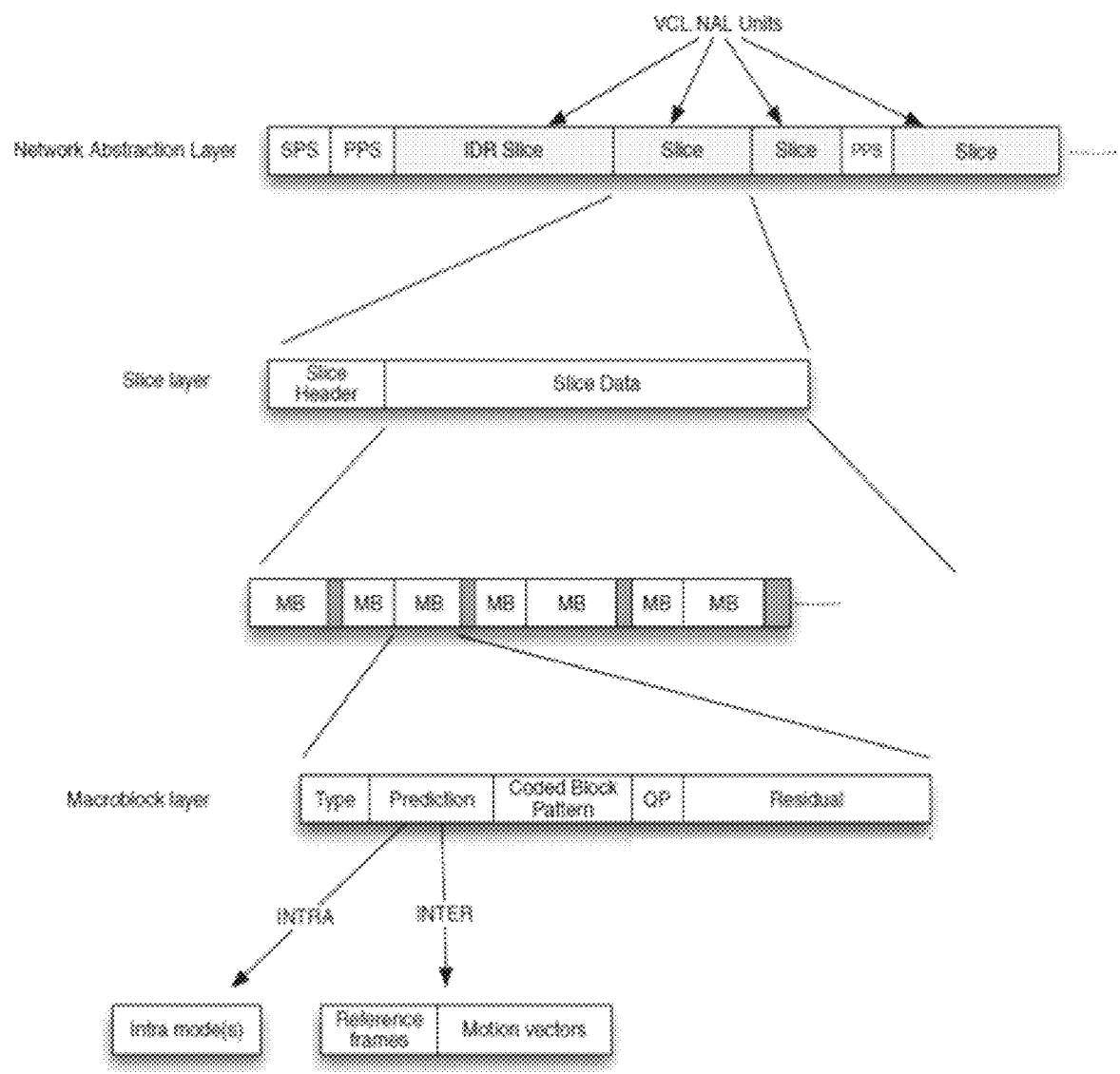
FIG. 1 is a diagram of a syntax structure of H.264.

As shown in FIG. 1, the H.264 standard encapsulates video data through Network Abstract Layer Unit (NALU), which can be divided into Sequence Parameter Set (SPS) or Picture Parameter Set (PPS), Instantaneous coding refresh slice (IDR slice), slice and other types. SPS/PPS stores the main video encoding parameters, such as profile, resolution, and a number of reference frames. IDR slice/slice saves the actual video compression data. Each slice consists of many macroblocks, and the macroblock information mainly includes prediction mode, partitioning method, and residual.

Video encoding and decoding support two prediction methods: intra and inter. Macroblocks are mainly divided into three types: I/P/B, and frames are mainly divided into three types: I/P/B. Therefore, for video streams with B frames, the encoding order of the video frames is different from the display order of the video frames. For P/B frames, the encoder will use multiple reference frames for inter prediction, while using long-term reference frames to further improve the video quality. H.264 inter prediction supports weighted prediction, which can select the weights of reference block pixels to reduce residual of motion compensation. The baseline/main profile uses 4×4 integer transformation, while the high profile supports both 4×4 and 8×8 transformations. In addition to the above encoding tools, the codec also calls deblocking filtering to improve the video quality before outputting the decoded frames.

Universal transcoding achieves source stream transcoding with watermarking, with a computational complexity of 86% for the encoder, 11% for the decoder, and 69% for the rate distortion optimization (RDO) function of the encoder.

For ease of understanding, continue to introduce the terms in FIG. 1:

1. Video Coding Layer (VCL)
2. Network Abstraction Layer (NAL)
3. Slice Layer, Slice Header, Slice Data
4. Macro Block (MB)
5. Macroblock Layer, Type, Prediction Mode, Macro Block Pattern, Quantization Parameter (QP), Residual
6. Intra modes, reference frames, motion vectors The present disclosure proposes a video transcoding method and apparatus, an electronic device, and a storage medium that can solve the problems of high computational complexity, long running time, significant video quality loss, and inconsistent input and output bit rates in universal transcoding schemes.

The following is a description of the video transcoding method and apparatus, electronic device, and storage medium in embodiments of the present application, in conjunction with the accompanying drawings.

Figure 2:
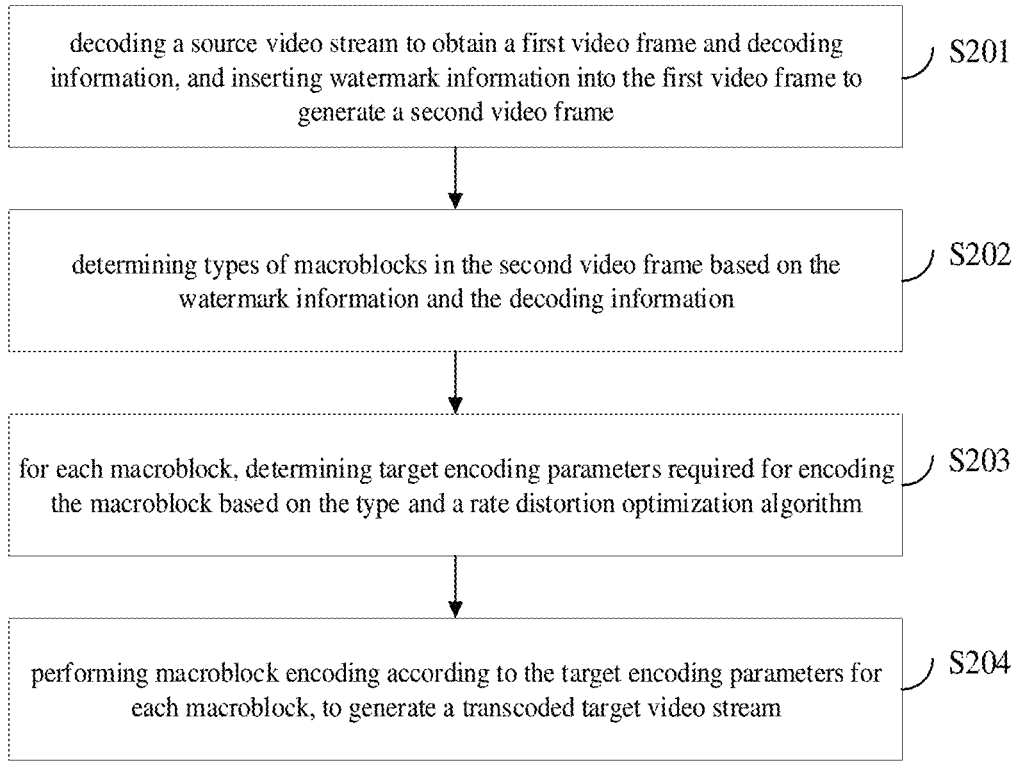
FIG. 2 is a flowchart of a video transcoding method in an embodiment of the present disclosure.

FIG. 2 is a flowchart of a video transcoding method in an embodiment of the present disclosure. As shown in FIG. 2, the video transcoding method includes steps S201 to S204.

At S201, a source video stream is decoded to obtain a first video frame and decoding information, and watermark information is inserted into the first video frame to generate a second video frame.

In embodiments of the present disclosure, the source video stream is obtained, input into the decoder, and decoded by the decoder to obtain the first video frame in the source video stream, and extract the decoding information of the first video frame.

In some embodiments, the decoding information includes header information, reference frame rearrangement information, reference image sequence labeling, decoder reference frame list, reconstructed pixels before deblocking filtering, and macroblock information. In some embodiments, the macroblock information includes prediction modes, partitioning methods, residuals, and quantization parameters.

The watermark information is inserted into the first video frame to generate the second video frame. On one hand, the watermark information can serve as privacy protection, copyright protection, or subtitle interpretation for the video frame. On the other hand, watermark information also identifies the modified pixels in the video frame, guiding the transcoding device to focus on macroblocks containing the modified pixels. In some embodiments, the watermark information may be copyright information, privacy information, subtitle information, etc.

At S202, types of macroblocks in the second video frame are determined based on the watermark information and the decoding information.

The video frames can be divided into multiple macroblocks, which are the basic unit of encoding. In some embodiments, the macroblock size is 16×16.

In embodiments of the present disclosure, the watermark information can partially or completely change one or more pixels within a portion of the macroblocks. The watermark information area refers to the area where pixels in the video frame have been modified. Based on the coordinate of the watermark information, the position of the modified pixels in the second video frame can be determined, and the macroblock containing the modified pixel in the second video frame can be determined as a first type macroblock.

Figure 3:
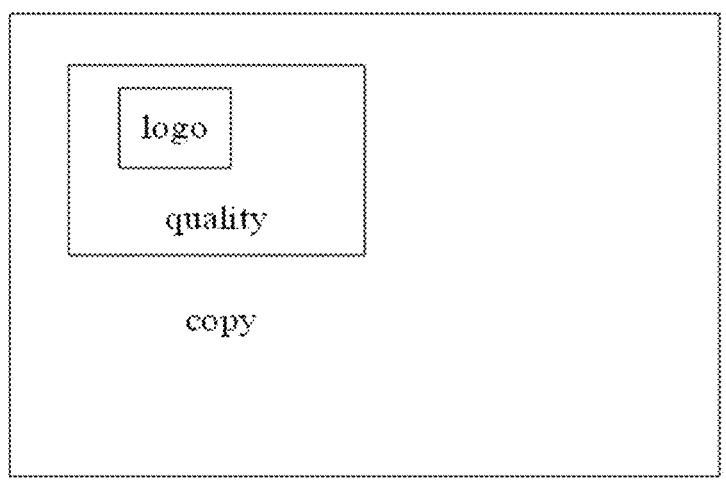
FIG. 3 is a schematic diagram of macroblock classification proposed in embodiments of the present disclosure.

That is to say, the first type is used to indicate that the macroblock is directly related to the watermark information. In a non-first type macroblock, a dependency relationship with the first type macroblock is determined based on the prediction mode in the decoding information of the macroblock, and the type of the macroblock is determined based on whether there is a dependency relationship with the first type macroblock. In an embodiment of the present disclosure, the type of the macroblock whose decoding information depends on the first type macroblock is determined as the second type, and the type of the macroblock whose decoding information does not depend on the first type macroblock is determined as the third type. In other words, when performing intra or inter prediction, the decoding information of the second type macroblock depends on the first type macroblock, and the decoding information of the third type macroblock does not depend on the first type macroblock. In this way, the types of all macroblocks in the second video frame are obtained. The classification of macroblocks is shown in FIG. 3, where logo represents the first type of macroblock, quality represents the second type of macroblock, and copy represents the third type of macroblock.

The purpose of determining the types of macroblocks is to selectively obtain target encoding parameters that matches the type of macroblock, thereby reducing computational complexity and improving transcoding speed.

At S203, for each macroblock, target encoding parameters required for encoding the macroblock are determined based on the type of the macroblock and a rate distortion optimization (RDO) algorithm.

In order to achieve fast transcoding of macroblocks, in embodiments of the present disclosure, different target encoding parameters may be corresponding to different types of macroblocks. In some embodiments, the target encoding parameters may include prediction mode, partitioning method, motion vector, integer transform size, quantization parameters, residual, etc.

The reference encoding pixels of the macroblock are used as inputs to the RDO algorithm, and the reference encoding pixels selected for the macroblock often affect the corresponding RDO value of the macroblock. In the implementation example of this application, different reference encoding pixels can be selected for different types of macroblocks. After determining the reference encoding pixels, candidate encoding parameters for the macroblock can be further obtained, where the candidate encoding parameters can include decoding information. RDO algorithm processing is performed on the reference encoded pixels and decoding information of the macroblock. By inputting the reference encoded pixels and decoding information of the macroblock into the RDO algorithm, candidate encoding parameters and their corresponding RDO values can be obtained. Furthermore, the candidate encoding parameter with the lowest RDO generation value can be selected as the target encoding parameter required for determining macroblock encoding. In the implementation example of this application, in the process of encoding the macroblock, the native RDO algorithm of the encoder is not directly called, but the logic of the RDO algorithm is changed. The RDO proxy value is calculated based on candidate encoding parameters including decoding information, and the smallest one is selected as the target encoding parameter, thereby reducing the computational complexity of the encoding process.

At S204, macroblock encoding is performed according to the target encoding parameters of each macroblock, to generate a target video stream after transcoding.

For any macroblock, based on the target encoding parameters of the macroblock, the macroblock is encoded according to the H.264 video standard to generate target encoding data corresponding to the second video frame, and the target video stream is generated based on the target encoding data of each frame.

The video transcoding method proposed in embodiments of this application decodes the source video stream to obtain the first video frame and decoding information, and inserts watermark information into the first video frame to generate the second video frame; determines the types of macroblocks in the second video frame based on the watermark information and the decoding information; for each macroblock, determines the target encoding parameters required for encoding the macroblock based on the type of the macroblock and the RDO algorithm; performs the macroblock encoding according to the target encoding parameters of each macroblock to generate the target video stream after transcoding.

In this method, the encoding process can be performed based on the decoding information, which not only reduces the computational complexity, but also ensures that the frame type of watermarked information is completely consistent with the source video stream, and has almost no damage to the image quality, resulting in the high video quality.

Figure 4:
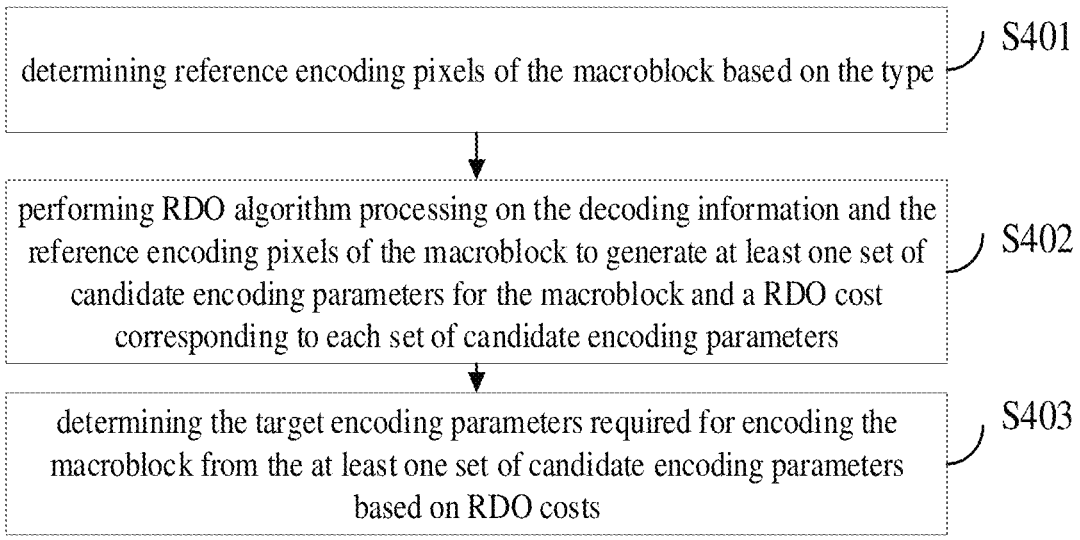
FIG. 4 is a flowchart of a video transcoding method in another embodiment of the present disclosure.

FIG. 4 is a flowchart of a video transcoding method in another embodiment of the present disclosure. As shown in FIG. 4, based on the above embodiment, step S203 may include steps S401 to S403.

At S401, reference encoding pixels of the macroblock are determined based on the type of the macroblock.

For video transcoding that does not require the insertion of watermark information, the encoder simply uses the decoding information for re-encoding, and thus the pixels before deblocking filtering at the encoding and decoding ends are the same. In embodiments of the present disclosure, the watermark information needs to be inserted into the source video stream during the video transcoding process, and the encoder needs to make full use of the decoding information to achieve efficient and high-quality transcoding.

For areas modified by watermark information, the reference encoding pixels need to directly use the pixels modified by watermark information, so as to ensure the accuracy of video transcoding. The first type of macroblock contains an area modified by the watermark information, while the non-first type of macroblock does not contain an area modified by the watermark information. Therefore, there may be differences in the reference encoding pixels between the two. It is necessary to select appropriate reference encoding pixels based on the type of macroblock.

At S402, RDO algorithm processing is performed on the decoding information and the reference encoded pixels of the macroblock, to generate at least one set of candidate encoding parameters for the macroblock and a RDO cost corresponding to each set of candidate encoding parameters.

In some implementations, the encoder uses the decoding information and the reference encoding pixels of the macroblock to generate encoding parameters and their corresponding RDO costs. In some implementations, the encoder uses the decoding information and reference encoding pixels of the macroblock other than macroblock residual to generate the encoding parameters and their corresponding RDO costs.

Based on practical application scenarios, due to the high complexity, high computational complexity, and low transcoding speed of the native RDO algorithm in obtaining encoding parameters, in order to balance the quality and speed of video transcoding, it is necessary to selectively select target encoding parameters for the macroblock. In some embodiments of the present disclosure, the encoding parameters generated using the decoding information of the macroblock are used as a set of candidate encoding parameters and their RDO costs are obtained, while the encoding parameters generated using the decoding information of the macroblock other than the macroblock residual are used as another set of candidate encoding parameters and their RDO costs are obtained, and the target encoding parameters are selected from the candidate encoding parameters.

In order to simplify the calculation, in embodiments of the present disclosure, the RDO costs are compared and the target encoding parameters are determined from the candidate encoding parameters. The RDO costs can indicate the optimal candidate encoding parameters as the target encoding parameters for video transcoding.

At S403, based on the RDO costs, the target encoding parameters required for encoding the macroblock are determined from at least one set of candidate encoding parameters.

The candidate encoding parameters corresponding to the minimum RDO cost among the candidate encoding parameters are determined as the target encoding parameters for the macroblock.

In some embodiments, in order to reduce the error, in embodiments of the present disclosure, a threshold may be preset. If the minimum RDO cost is greater than the preset threshold, the encoder's native RDO algorithm is called to obtain the native RDO cost and native encoding parameters of the macroblock, and then the minimum RDO cost is compared with the native RDO cost. If the minimum RDO cost is less than or equal to the native RDO cost, a set of candidate encoding parameters corresponding to the minimum RDO cost are determined as the target encoding parameters for the macroblock. If the minimum RDO cost is greater than the native RDO cost, the native encoding parameters are used as the target encoding parameters for the macroblock.

Figure 5:
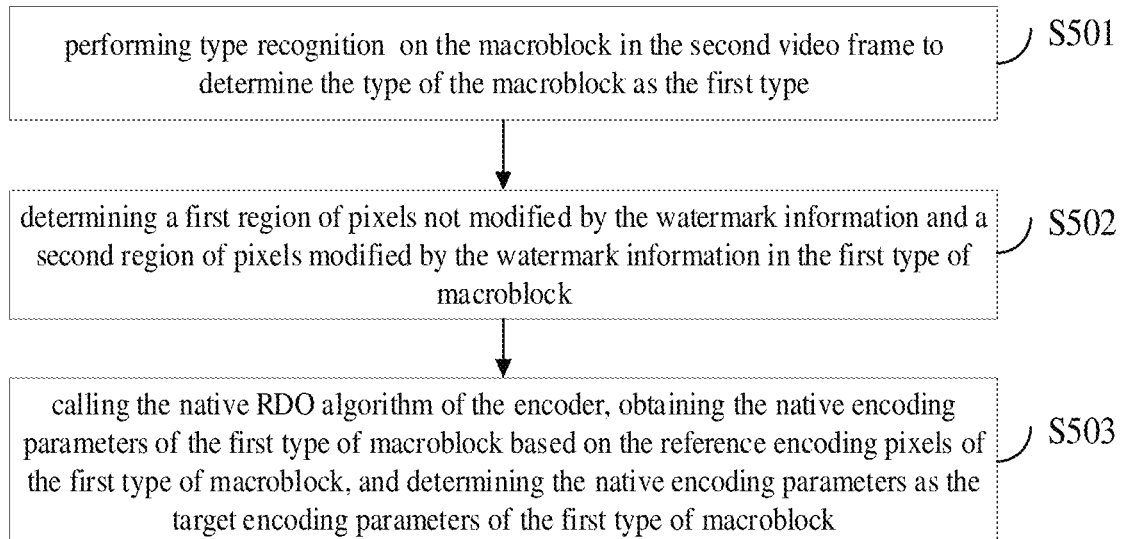
FIG. 5 is a flowchart of a video transcoding method in another embodiment of the present disclosure.

FIG. 5 is a flowchart of a video transcoding method in another embodiment of the present disclosure. As shown in FIG. 5, based on the above embodiments, when the type of the macroblock is the first type, the encoding process of the macroblock includes steps S501 to S503.

At S501, type recognition is performed on the macroblock in the second video frame to determine the type of the macroblock as the first type.

Referring to step S102, the macroblock containing the modified pixels in the second video frame is determined as the first type macroblock, which is used to indicate that the macroblock is directly related to the watermark information.

At S502, a first region of pixels not modified by the watermark information and a second region of pixels modified by the watermark information are determined in the first type of macroblock.

In the implementation, a watermark is inserted on the video frame. The watermark may only occupy one or more pixels in a portion of the macroblock, which means that the first type of macroblock may contain regions that have been modified by the watermark information or regions that have not been modified by the watermark information. Therefore, it is necessary to divide the first type of macroblock into regions, to confirm its reference encoding pixels. In embodiments of this disclosure, the region where the pixels have not been modified by the watermark information is regarded as the first region, and the region where the pixels have been modified by the watermark information is regarded as the second region. The reference encoding pixels of the second region are the pixels currently input by the encoder, and the current input pixels are the pixels modified by the watermark information.

For the first region that has not been modified by the watermark information, the reconstructed pixels before deblocking filtering of the decoder can be used as the reference encoding pixels for the first region. This not only improves the encoding quality, but also ensures the efficiency of video transcoding due to the transcoding of the decoding information.

For the second region modified by the watermark information, the reference encoding pixels directly use the pixels modified by the watermark information, to ensure the accuracy of video transcoding.

At S503, the native RDO algorithm of the encoder is called, the native encoding parameters of the first type of macroblock are obtained based on the reference encoding pixels of the first type of macroblock, and the native encoding parameters are determined as the target encoding parameters of the first type of macroblock.

For the first type of macroblock, based on the reference encoding pixels obtained in step S502, the native RDO algorithm of the encoder is called to obtain the native encoding parameters of the macroblock, and the native encoding parameters are determined as the target encoding parameters of the first type of macroblock. According to the target encoding parameters, macroblock encoding is performed to generate the target encoding data corresponding to the second video frame, and then the transcoded target video stream is generated.

The video transcoding method in embodiments of the present disclosure not only reduces the computational complexity, but also ensures that the frame type of watermarked information is completely consistent with the source video stream, and has almost no damage to the image quality, resulting in the high video quality.

Figure 6:
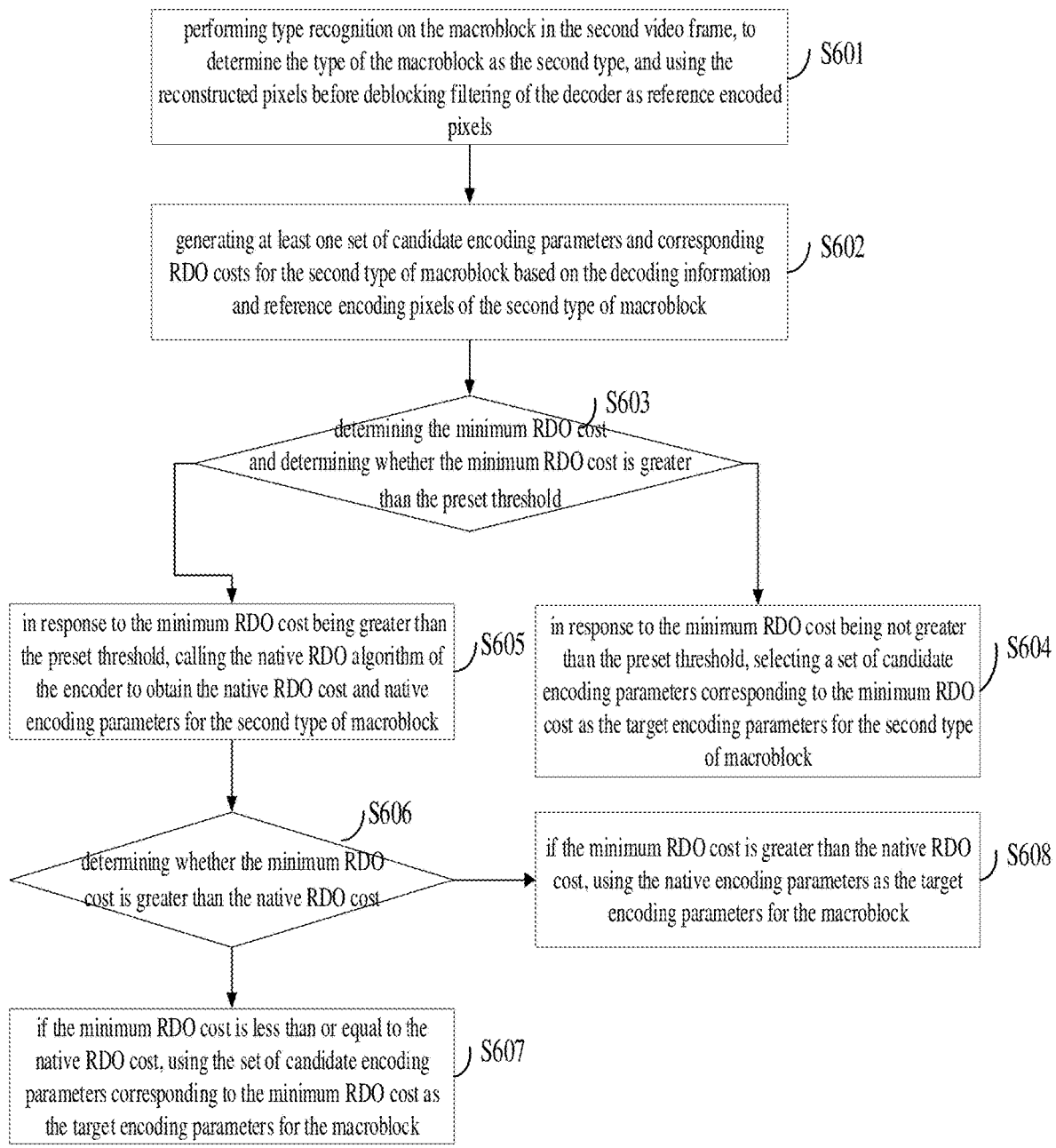
FIG. 6 is a flowchart of a video transcoding method in another embodiment of the present disclosure.

FIG. 6 is a flowchart of a video transcoding method in another embodiment of the present disclosure. As shown in FIG. 6, based on the above embodiments, when the type of the macroblock is the second type, the encoding process of the macroblock includes steps S601 to S608.

At S601, type recognition is performed on the macroblock in the second video frame, to determine the type of the macroblock as the second type, and the reconstructed pixels before deblocking filtering of the decoder are determined as reference encoded pixels.

The second type indicates a dependency relationship between the macroblock and the macroblock carrying the watermark information.

Referring to step S102, for the non-first type in the second video frame that does not contain modified pixels, the type of the macroblock that relies on the decoding information of the first type of macroblock in the prediction mode is determined as the second type.

The reconstructed pixels before deblocking filtering in the decoder are used as reference encoding pixels of the non-first type, that is, the reference encoding pixels of the second type of macroblock are the reconstructed pixels before deblocking filtering.

At S602, at least one set of candidate encoding parameters and corresponding RDO costs for the second type of macroblock are generated based on the decoding information and reference encoding pixels of the second type of macroblock.

In embodiments of the present disclosure, the encoding parameters generated by using the decoding information and reference encoded pixels of the macroblock are used as a set of candidate encoding parameters and its RDO cost is obtained. The encoding parameters generated by using the decoding information and the reference encoded pixels of the macroblock other than the macroblock residual are used as another set of candidate encoding parameters and its RDO cost is obtained.

The native RDO algorithm of the encoder has a high complexity. In order to reduce the number of calls to the RDO algorithm, in an embodiment of the present disclosure, the RDO costs corresponding to respective sets of candidate encoding parameters are compared to obtain the target encoding parameters.

At S603, the minimum RDO cost is determined and whether the minimum RDO cost is greater than the preset threshold is determined.

RDO is an algorithm module that can compare the advantages and disadvantages of video encoders through Rate Distortion (RD) curves. In the RD two-dimensional graph, an optimal point is selected, which corresponds to one cost. The cost is the value used to select the optimal encoding method, with the lowest cost indicating that the encoding parameters corresponding to the cost are the optimal encoding parameters of the macroblock. Therefore, in order to select the optimal encoding parameters for the macroblock, in an embodiment of the present disclosure, the minimum RDO cost is first compared with the preset threshold to determine whether the minimum RDO cost is greater than the preset threshold.

At S604, in response to the minimum RDO cost being not greater than the preset threshold, a set of candidate encoding parameters corresponding to the minimum RDO cost is selected as the target encoding parameters for the second type of macroblock.

If the minimum RDO cost is not greater than the preset threshold, it indicates that the candidate encoding parameters corresponding to the current minimum RDO cost meet the requirements. The set of candidate encoding parameters corresponding to the minimum RDO cost can be used as the target encoding parameters for encoding the second type of macroblock.

At S605, in response to the minimum RDO cost being greater than the preset threshold, the native RDO algorithm of the encoder is called to obtain the native RDO cost and native encoding parameters for the second type of macroblock.

If the minimum RDO cost is greater than the preset threshold, it indicates that the candidate encoding parameters corresponding to the current minimum RDO cost may not be the optimal encoding parameters. It is necessary to call the encoder's native RDO algorithm to obtain the native RDO cost and native encoding parameters of the macroblock, and continue to compare the native RDO cost with the current minimum RDO cost to update the minimum RDO cost.

At S606, it is determined whether the minimum RDO cost is greater than the native RDO cost.

At S607, if the minimum RDO cost is less than or equal to the native RDO cost, the set of candidate encoding parameters corresponding to the minimum RDO cost is used as the target encoding parameters for the macroblock.

If the minimum RDO cost is less than or equal to the native RDO cost, the set of candidate encoding parameters corresponding to the minimum RDO cost will be used as the target encoding parameters for the macroblock, and according to the target encoding parameters, macroblock encoding is performed to generate the target encoding data corresponding to the second video frame, and then the transcoded target video stream is generated.

At S608, if the minimum RDO cost is greater than the native RDO cost, the native encoding parameters are used as the target encoding parameters for the macroblock.

If the minimum RDO cost is greater than the native RDO cost, then the native encoding parameters are used as the target encoding parameters for the macroblock, and according to the target encoding parameters, macroblock encoding is performed to generate the target encoding data corresponding to the second video frame, and then the transcoded target video stream is generated.

The video transcoding method in embodiments of the present disclosure not only reduces the computational complexity, but also ensures that the frame type of watermarked information is completely consistent with the source video stream, and has almost no damage to the image quality, resulting in the high video quality.

Figure 7:
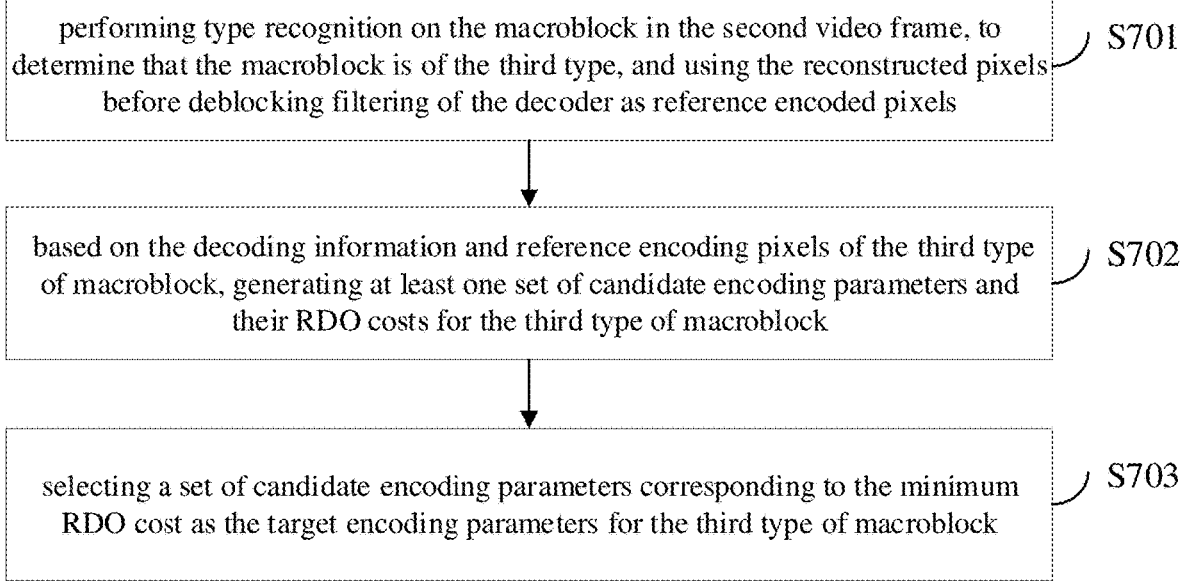
FIG. 7 is a flowchart of a video transcoding method in another embodiment of the present disclosure.

FIG. 7 is a flowchart of a video transcoding method in another embodiment of the present disclosure. As shown in FIG. 7, based on the above embodiments, when the type of the macroblock is the third type, the encoding process of the macroblock includes steps S701 to S703.

At S701, type recognition is performed on the macroblock in the second video frame, to determine that the macroblock is of the third type, and the reconstructed pixels before deblocking filtering of the decoder are used as reference encoded pixels.

The third type of macroblock indicates that there is no dependency relationship between the macroblock and the macroblock carrying the watermark information.

Refer to step S102, for the non-first type in the second video frame that does not contain modified pixels, the type of the macroblock that does not rely on the decoding information of the first type of macroblock in the prediction mode is determined as the third type.

The reconstructed pixels before the deblocking filtering of the decoder are used as the reference encoding pixels of the non-first type, that is, the reference encoding pixels of the third type of macroblock are the reconstructed pixels before the deblocking filtering of the decoder.

At S702, based on the decoding information and reference encoding pixels of the third type of macroblock, at least one set of candidate encoding parameters and their RDO costs are generated for the third type of macroblock.

For the specific introduction of steps S701 and S702, please refer to the relevant content recorded in the above embodiments, which will not be elaborated here.

At S703, a set of candidate encoding parameters corresponding to the minimum RDO cost is selected as the target encoding parameters for the third type of macroblock.

In order to obtain the optimal encoding parameters, the candidate encoding parameters with the lowest RDO cost can be selected as the target encoding parameters required for encoding the third type of macroblock. According to the target encoding parameters, macroblock encoding is performed to generate the target encoding data corresponding to the second video frame, and then the transcoded target video stream is generated.

The video transcoding method in embodiments of the present disclosure not only reduces the computational complexity, but also ensures that the frame type of watermarked information is completely consistent with the source video stream, and has almost no damage to the image quality, resulting in the high video quality.

Figure 8:
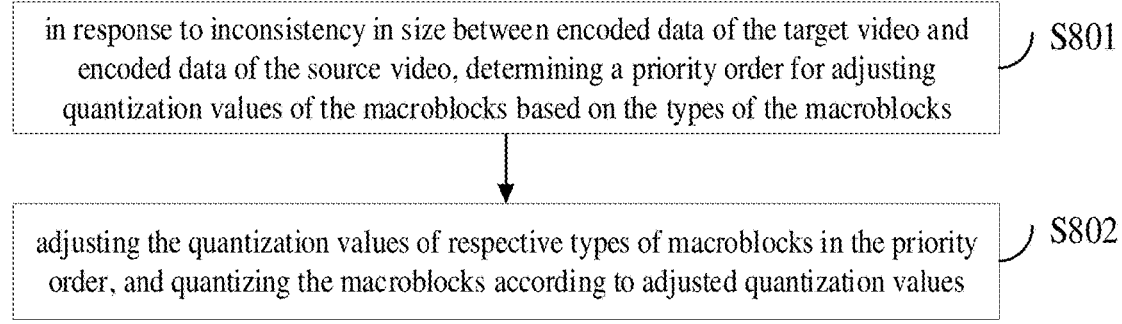
FIG. 8 is a flowchart of a video transcoding method in another embodiment of the present disclosure.

FIG. 8 is a flowchart of a video transcoding method in another embodiment of the present disclosure. As shown in FIG. 8, based on the above embodiments, the video transcoding method further includes steps S801 to S802.

At S801, in response to an inconsistency in size between encoded data of the target video and encoded data of the source video, a priority order for adjusting quantization values of the macroblocks is determined based on the types of the macroblocks.

If the encoded data of the target video does not match the size of the encoded data of the source video, the quantization values need to be adjusted to unify the size of the video frames and ensure the stability of transcoding.

In the application scenario of inserting watermark information into the source video stream for video transcoding, the proportion of the first type and second type macroblocks is very small, and most of the macroblocks are of the third type. Due to the dependence on the decoding information during the transcoding process of the third type of macroblock, the size of its encoded data remains almost unchanged. Therefore, the priority order for adjusting the quantization values of macroblocks is: first type macroblocks, second type macroblocks, and third type macroblocks. That is to say, when the size of the encoded data of the target video is inconsistent with that of the source video, the quantization values of the first type of macroblocks are first adjusted.

At S802, the quantization values of respective types of macroblock are adjusted according to the priority order, and the macroblocks are quantized according to the adjusted quantization values.

When the encoded data of the target video is inconsistent with the encoded data of the source video, the quantization values of the first type of macroblocks are first adjusted, and the macroblocks are quantized according to the adjusted quantization values. If the encoded data of the target video after adjusting is consistent with the encoded data of the source video, the quantization and adjustment ends. Otherwise, the quantization values of the second type of macroblocks are adjusted, and the macroblocks are quantized according to the quantization values after the second adjustment, and it is determined whether the encoded data of the adjusted target video is the same size as the encoded data of the source video. If they are consistent, the quantization and adjustment ends. Otherwise, the quantization values of the third type of macroblocks are adjusted and the macroblocks are quantized according to the quantization values after the third adjustment, until the encoded data of the target video is the same size as the encoded data of the source video.

Quantization is a lossy compression technique that can affect the quality of video frames. Therefore, in order to ensure the quality of video frames after transcoding, each adjustment of quantization values needs to meet the lowest quality requirements.

The video transcoding method in embodiments of the present disclosure not only reduces the computational complexity, but also ensures that the frame type of watermarked information is completely consistent with the source video stream, and has almost no damage to the image quality, resulting in the high video quality.

Figure 9:
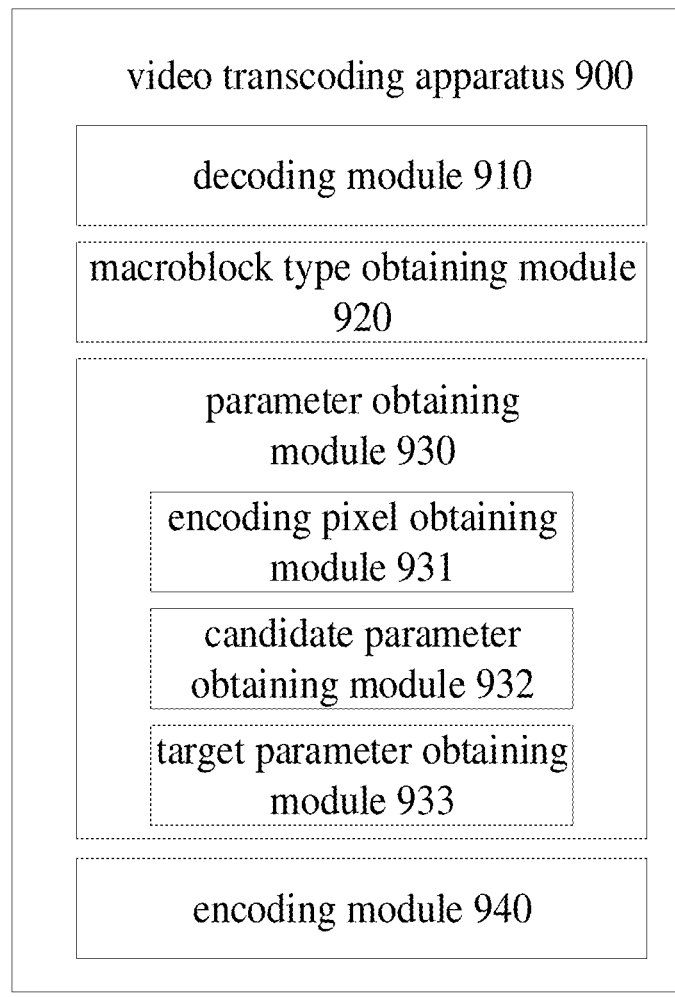
FIG. 9 is a block diagram of a video transcoding apparatus in an embodiment of the present disclosure.

As shown in FIG. 9, embodiments of the present disclosure further provide a video transcoding apparatus 900, including:
  a decoding module 910, configured to decode a source video stream to obtain a first video frame and decoding information, and inserting watermark information into the first video frame to generate a second video frame;

a macroblock type obtaining module 920, configured to determine types of macroblocks in the second video frame based on the watermark information and the decoding information;

a parameter obtaining module 930, configured to, for each macroblock, determine target encoding parameters required for encoding the macroblock based on the type and a rate distortion optimization algorithm; and an encoding module 940, configured to perform macroblock encoding according to the target encoding parameters for each macroblock, to generate a transcoded target video stream.

Further, in a possible implementation of embodiments of the present disclosure, the parameter obtaining module 930 includes:

an encoding pixel obtaining module 931, configured to determine reference encoding pixels of the macroblock based on the type;

a candidate parameter obtaining module 932, configured to perform RDO algorithm processing on the decoding information and the reference encoding pixels of the macroblock to generate at least one set of candidate encoding parameters for the macroblock and a RDO cost corresponding to each set of candidate encoding parameters;

a target parameter obtaining module 933, configured to determine the target encoding parameters required for encoding the macroblock from the at least one set of candidate encoding parameters based on RDO costs.

Further, in a possible implementation of embodiments of the present disclosure, the encoding pixel obtaining module 931 is further configured to:

for a non-first type of macroblock, determine reconstructed pixels before deblocking filtering of a decoder as the reference encoded pixels;

for a first type of macroblock, determine a first region of pixels not modified by the watermark information and a second region of pixels modified by the watermark information in the first type of macroblock, wherein the reference encoding pixels of the first region are the reconstructed pixels before the deblocking filtering of the decoder, the reference encoding pixels of the second region are pixels currently input by an encoder, and the pixels currently input are pixels modified by the watermark information;

wherein the first type of macroblock is configured to indicate being related with the watermark information.

Further, in possible implementation of embodiments of the present disclosure, the parameter obtaining module 930 is further configured to:

in response to the type of the macroblock being the non-first type, select a set of candidate encoding parameters corresponding to a minimum RDO cost as the target encoding parameters for the macroblock.

Further, in a possible implementation of embodiments of the present disclosure, the target parameter obtaining module 933 is further configured to:

in response to the type of the macroblock being a second type and the minimum RDO cost being greater than a preset threshold, call a native RDO algorithm of the encoder to obtain a native RDO cost and native encoding parameters for the macroblock, wherein the second type indicates that there is a dependency relationship between the macroblock and the macroblock carrying the watermark information;

if the minimum RDO cost is less than or equal to the native RDO cost, determine a set of candidate encoding parameters corresponding to the minimum RDO cost as the target encoding parameters for the macroblock;

if the minimum RDO cost is greater than the native RDO cost, determine the native encoding parameters as the target encoding parameters for the macroblock.

Further, in a possible implementation of embodiments of the present disclosure, the target parameter obtaining module 933 is further configured to:

in response to the type of the macroblock being the first type, call a native RDO algorithm of the encoder to generate native encoding parameters for the macroblock, and determine the native encoding parameters as the target encoding parameters for the macroblock.

Further, in a possible implementation of embodiments of the present disclosure, the encoding module 940 is further configured to:

perform the macroblock encoding on the macroblocks based on the target encoding parameters for each macroblock to generate target encoded data corresponding to the second video frame, and generate the target video stream based on the target encoded data of each frame.

Further, in a possible implementation of embodiments of the present disclosure, the macroblock type obtaining module 920 is further configured to:

obtain modified pixels of the second video frame when the watermark information is inserted into the second video frame, and determine the type of the macroblock containing the modified pixels as the first type;

for any remaining block, determine whether the any remaining macroblock is dependent on the first type of macroblock based on the decoding information of the any remaining macroblock;

determine the type of any macroblock that is dependent on the first type of macroblock as a second type, and determine the type of any macroblock that is not dependent on the first type of macroblock as a third type.

Further, in a possible implementation of embodiments of the present disclosure, the encoding module 940 is further configured to:

in response to inconsistency in size between encoded data of the target video and encoded data of the source video, determine a priority order for adjusting quantization values of the macroblocks based on the types of the macroblocks;

adjust the quantization values of respective types of macroblocks in the priority order, and quantize the macroblocks according to adjusted quantization values.

Embodiments of the present disclosure further provide an electronic device.

Figure 10:
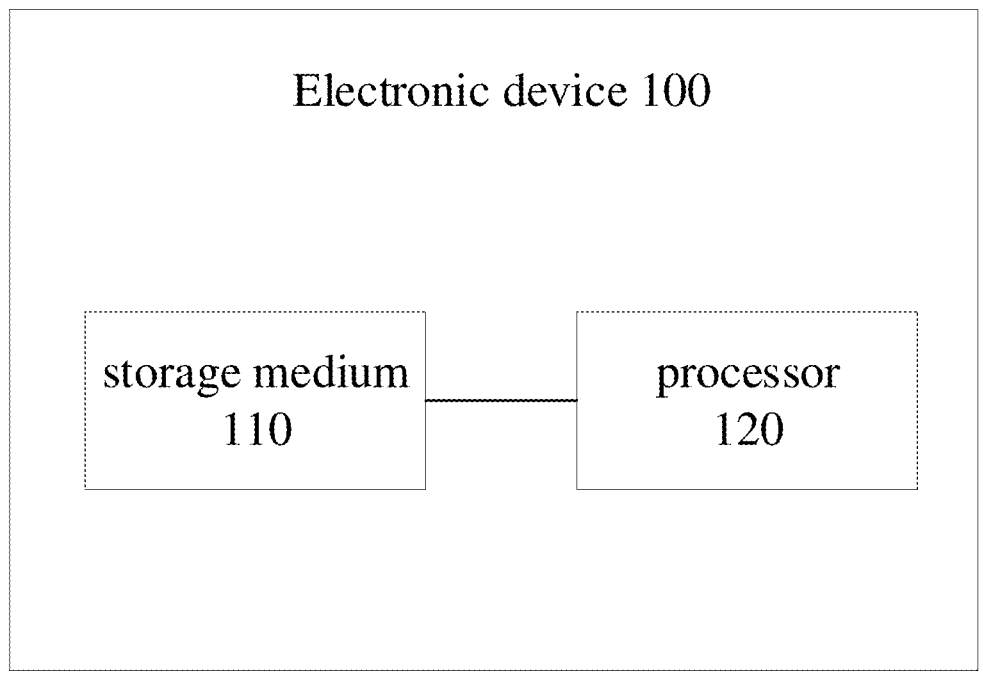
FIG. 10 is a schematic diagram of an electronic device in an embodiment of the present disclosure.

FIG. 10 is a block diagram of an electronic device provided by embodiments of the present disclosure. As shown in FIG. 10, the electronic device 100 includes a storage medium 110, a processor 120, and a computer program product stored in the memory 110 and capable of running on the processor 120. When the processor executes the computer program, the aforementioned video transcoding method is implemented.

Technicians in this field should understand that embodiments of this disclosure may be provided as methods, systems, or computer program products. Therefore, this disclosure may take the form of complete hardware embodiments, complete software embodiments, or embodiments combining software and hardware aspects. Moreover, this disclosure may take the form of a computer program product implemented on one or more computer available storage media (including but not limited to disk storage, CD-ROM, optical storage, etc.) containing computer available program code.

This disclosure is described with reference to the flowchart and/or block diagram of the method, device (system), and computer program product according to the embodiments of this disclosure. It should be understood that each process and/or box in a flowchart and/or block diagram can be implemented by computer program instructions, as well as the combination of processes and/or boxes in the flowchart and/or block diagram. These computer program instructions can be provided to processors of general-purpose computers, specialized computers, embedded processors, or other programmable data processing devices to generate a machine that generates instructions executed by processors of computers or other programmable data processing devices to implement functions specified in a flowchart or multiple flows and/or a block diagram or multiple boxes.

These computer program instructions can also be stored in computer readable memory that can guide a computer or other programmable data processing device to work in a specific way, causing the instructions stored in the computer readable memory to generate a manufacturing product including instruction devices, which implement the functions specified in one or more processes and/or blocks of a flowchart.

These computer program instructions can also be loaded onto a computer or other programmable data processing device to perform a series of operational steps on the computer or other programmable device to generate computer-implemented processing. The instructions executed on the computer or other programmable device provide steps for implementing the functions specified in a flowchart or multiple processes and/or a block diagram or multiple boxes.

Embodiments of the present disclosure further provide a computer readable storage medium on which computer instructions are stored, wherein the computer instructions are configured to cause the computer to execute the video transcoding method in the aforementioned embodiments.

Embodiments of this disclosure further provide a computer program product, including a computer program that performs the video transcoding method in the aforementioned embodiments when executed by a processor.

It should be noted that in the claims, any reference symbols located between parentheses should not be constructed as restrictions on the claims. The word 'comprising' does not exclude the presence of components or steps not listed in the claims. The words "the" or "a" before a component do not exclude the existence of multiple such components. This application can be implemented with the help of hardware consisting of several different components and with the help of appropriately programmed computers. Among the unit claims that list several devices, several of these devices can be specifically embodied through the same hardware item. The use of words first, second, and third does not indicate any order. These words can be interpreted as names.

In addition, the terms "first" and "second" are only used to describe the purpose and cannot be understood as indicating or implying relative importance or implying the quantity of technical features indicated. Therefore, features limited to "first" and "second" can explicitly or implicitly include one or more of these features. In the description of this application, "multiple" means two or more, unless otherwise specified.

All embodiments of this disclosure can be executed separately or in combination with other embodiments, all of which are considered within the scope of protection required by this disclosure.

What is claimed is:

1. A video transcoding method, comprising:
    decoding a source video stream to obtain a first video frame and decoding information, and inserting watermark information into the first video frame to generate a second video frame;
    determining types of macroblocks in the second video frame based on the watermark information and the decoding information;
    for each macroblock, determining target encoding parameters required for encoding the each macroblock based on a type of the each macroblock and a rate distortion optimization algorithm; and
    performing macroblock encoding according to the target encoding parameters for the each macroblock to generate a transcoded target video stream,
    wherein the determining target encoding parameters required for encoding the each macroblock based on the type of the each macroblock and the rate distortion optimization algorithm comprises:
        determining reference encoding pixels of the each macroblock based on the type of the each macroblock;
        performing RDO algorithm processing on the decoding information and the reference encoding pixels of the each macroblock to generate at least one set of candidate encoding parameters for the each macroblock and a RDO cost corresponding to each set of the candidate encoding parameters; and
        determining the target encoding parameters required for encoding the each macroblock from the at least one set of candidate encoding parameters based on the RDO cost,
    wherein the determining the reference encoding pixels of the each macroblock based on the type of the each macroblock further comprises:
        for a non-first type of macroblock, determining reconstructed pixels before deblocking filtering of a decoder as reference encoded pixels; and
        for a first type of macroblock, determining a first region of pixels not modified by the watermark information and a second region of pixels modified by the watermark information in the first type of macroblock, wherein reference encoding pixels of the first region are the reconstructed pixels before the deblocking filtering of the decoder, reference encoding pixels of the second region are pixels currently input by an encoder, the pixels currently input are pixels modified by the watermark information, and the first type of macroblock is configured to indicate being related with the watermark information.

2. The method according to claim 1, wherein the determining the target encoding parameters required for encoding the each macroblock from the at least one set of candidate encoding parameters based on the RDO cost, comprises:
    in response to the type of the each macroblock being the non-first type, selecting a set of candidate encoding parameters corresponding to a minimum RDO cost as the target encoding parameters for the each macroblock.

3. The method according to claim 2, further comprising:
in response to the type of the each macroblock being the first type, calling a native RDO algorithm of the encoder to generate native encoding parameters for the each macroblock, and determining the native encoding parameters as the target encoding parameters for the each macroblock.

4. The method according to claim 1, further comprising:
in response to the type of the each macroblock being a second type and a minimum RDO cost being greater than a preset threshold, calling a native RDO algorithm of the encoder to obtain a native RDO cost and native encoding parameters for the each macroblock, wherein the second type indicates that there is a dependency relationship between the each macroblock and the each macroblock carrying the watermark information;
if the minimum RDO cost is less than or equal to the native RDO cost, determining a set of candidate encoding parameters corresponding to the minimum RDO cost as the target encoding parameters for the each macroblock;
if the minimum RDO cost is greater than the native RDO cost, determining the native encoding parameters as the target encoding parameters for the each macroblock.

5. The method according to claim 1, wherein the performing macroblock encoding according to the target encoding parameters for the each macroblock to generate the transcoded target video stream, comprises:
performing the macroblock encoding on the macroblocks based on the target encoding parameters for the each macroblock to generate target encoded data corresponding to the second video frame, and generating the target video stream based on the target encoded data of each frame.

6. The method according to claim 1, wherein the determining the types of macroblocks in the second video frame based on the watermark information and the decoding information, comprises:
obtaining modified pixels of the second video frame when the watermark information is inserted into the second video frame, and determining the type of the each macroblock containing the modified pixels as the first type;
for any remaining macroblock, determining whether the any remaining macroblock is dependent on the first type of macroblock based on decoding information of the any remaining macroblock;
determining a type of any macroblock that is dependent on the first type of macroblock as a second type, and determining the type of any macroblock that is not dependent on the first type of macroblock as a third type.

7. The method according to claim 1, wherein before the performing the macroblock encoding according to the target encoding parameters for the each macroblock,
in response to inconsistency in size between encoded data of target video and encoded data of source video, determining a priority order for adjusting quantization values of the macroblocks based on the types of the macroblocks; and
adjusting the quantization values of respective types of the macroblocks in the priority order, and quantizing the macroblocks according to adjusted quantization values.

8. An electronic device, comprising:
at least one processor;
a memory in communication connection with the at least one processor,
wherein the memory is stored with instructions executable by the at least one processor, the instructions, when executed by the at least one processor, enable the at least one processor to:
decode a source video stream to obtain a first video frame and decoding information, and insert watermark information into the first video frame to generate a second video frame;
determine types of macroblocks in the second video frame based on the watermark information and the decoding information;
for each macroblock, determine target encoding parameters required for encoding the each macroblock based on a type of the each macroblock and a rate distortion optimization algorithm; and
perform macroblock encoding according to the target encoding parameters for the each macroblock to generate a transcoded target video stream;
wherein the target encoding parameters required for encoding the each macroblock are determined based on the type of the each macroblock and the rate distortion optimization algorithm using the steps of:
determining reference encoding pixels of the each macroblock based on the type of the each macroblock;
performing RDO algorithm processing on the decoding information and the reference encoding pixels of the each macroblock to generate at least one set of candidate encoding parameters for the each macroblock and a RDO cost corresponding to each set of the candidate encoding parameters; and
determining the target encoding parameters required for encoding the each macroblock from the at least one set of candidate encoding parameters based on the RDO cost,
wherein the reference encoding pixels of the each macroblock are determined based on the type of the each macroblock using the steps of:
for a non-first type of macroblock, determining reconstructed pixels before deblocking filtering of a decoder as reference encoded pixels; and
for a first type of macroblock, determining a first region of pixels not modified by the watermark information and a second region of pixels modified by the watermark information in the first type of macroblock, wherein reference encoding pixels of the first region are the reconstructed pixels before the deblocking filtering of the decoder, reference encoding pixels of the second region are pixels currently input by an encoder, the pixels currently input are pixels modified by the watermark information, and the first type of macroblock is configured to indicate being related with the watermark information.

9. The electronic device according to claim 8, wherein the target encoding parameters required for encoding the each macroblock from the at least one set of candidate encoding parameters are determined based on the RDO cost when the instructions are executed by the at least one processor, the at least one processor is enabled to:
in response to the type of the each macroblock being the non-first type, select a set of candidate encoding parameters corresponding to a minimum RDO cost as the target encoding parameters for the each macroblock.

10. The electronic device according to claim 8, wherein when the instructions are executed by the at least one processor, the at least one processor is further enabled to:
in response to the type of the each macroblock being a second type and a minimum RDO cost being greater than a preset threshold, calling a native RDO algorithm of the encoder to obtain a native RDO cost and native encoding parameters for the each macroblock, wherein the second type indicates that there is a dependency relationship between the each macroblock and the each macroblock carrying the watermark information;
if the minimum RDO cost is less than or equal to the native RDO cost, determining a set of candidate encoding parameters corresponding to the minimum RDO cost as the target encoding parameters for the each macroblock;
if the minimum RDO cost is greater than the native RDO cost, determining the native encoding parameters as the target encoding parameters for the each macroblock.

11. The electronic device according to claim 9, wherein when the instructions are executed by the at least one processor, the at least one processor is further enabled to:
in response to the type of the each macroblock being the first type, call a native RDO algorithm of the encoder to generate native encoding parameters for the each macroblock, and determine the native encoding parameters as the target encoding parameters for the each macroblock.

12. The electronic device according to claim 8, wherein when the instructions are executed by the at least one processor, the at least one processor is further enabled to:
perform the macroblock encoding on the macroblocks based on the target encoding parameters for the each macroblock to generate target encoded data corresponding to the second video frame, and generate the target video stream based on the target encoded data of each frame.

13. The electronic device according to claim 8, wherein the types of macroblocks in the second video frame are determined based on the watermark information and the decoding information when the instructions are executed by the at least one processor, the at least one processor is enabled to:
obtain modified pixels of the second video frame when the watermark information is inserted into the second video frame, and determine the type of the each macroblock containing the modified pixels as the first type;
for any remaining macroblock, determine whether the any remaining macroblock is dependent on the first type of macroblock based on decoding information of the any remaining macroblock;
determine a type of any macroblock that is dependent on the first type of macroblock as a second type, and determining the type of any macroblock that is not dependent on the first type of macroblock as a third type.

14. The electronic device according to claim 8, wherein before performing of the macroblock encoding according to the target encoding parameters for the each macroblock, the at least one processor is further enabled to:
in response to inconsistency in size between encoded data of target video and encoded data of source video, determine a priority order for adjusting quantization values of the macroblocks based on the types of the macroblocks; and
adjust the quantization values of respective types of the macroblocks in the priority order, and quantize the macroblocks according to adjusted quantization values.

15. A non-transitory computer readable storage medium stored with computer instructions, wherein the computer instructions, when executed, are configured to cause a computer to perform a video transcoding method, the method comprising:
decoding a source video stream to obtain a first video frame and decoding information, and inserting watermark information into the first video frame to generate a second video frame;
determining types of macroblocks in the second video frame based on the watermark information and the decoding information;
for each macroblock, determining target encoding parameters required for encoding the each macroblock based on a type of the each macroblock and a rate distortion optimization algorithm; and
performing macroblock encoding according to the target encoding parameters for the each macroblock to generate a transcoded target video stream,
wherein the determining target encoding parameters required for encoding the each macroblock based on the type of the each macroblock and the rate distortion optimization algorithm comprises:
determining reference encoding pixels of the each macroblock based on the type of the each macroblock;
performing RDO algorithm processing on the decoding information and the reference encoding pixels of the each macroblock to generate at least one set of candidate encoding parameters for the each macroblock and a RDO cost corresponding to each set of the candidate encoding parameters; and
determining the target encoding parameters required for encoding the each macroblock from the at least one set of candidate encoding parameters based on the RDO cost,
wherein the determining the reference encoding pixels of the each macroblock based on the type of the each macroblock further comprises:
for a non-first type of macroblock, determining reconstructed pixels before deblocking filtering of a decoder as reference encoded pixels; and
for a first type of macroblock, determining a first region of pixels not modified by the watermark information and a second region of pixels modified by the watermark information in the first type of macroblock, wherein reference encoding pixels of the first region are the reconstructed pixels before the deblocking filtering of the decoder, reference encoding pixels of the second region are pixels currently input by an encoder, the pixels currently input are pixels modified by the watermark information, and the first type of macroblock is configured to indicate being related with the watermark information.

\* \* \* \* \*